US008640048B1

(12) United States Patent
Parsons

(10) Patent No.: US 8,640,048 B1
(45) Date of Patent: Jan. 28, 2014

(54) DISPLAYING INFORMATION HAVING HEADERS OR LABELS ON A DISPLAY DEVICE DISPLAY PANE

(75) Inventor: Vincent L. Parsons, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1479 days.

(21) Appl. No.: 11/000,563

(22) Filed: Nov. 30, 2004

(51) Int. Cl.
*G06F 3/048* (2013.01)
*G06F 3/00* (2006.01)
*G06F 17/30* (2006.01)

(52) U.S. Cl.
USPC ........... 715/788; 715/784; 715/785; 715/786; 715/787; 715/776; 715/206; 715/234; 725/41; 725/42; 725/43

(58) Field of Classification Search
USPC .................................................. 715/784–787
See application file for complete search history.

(56) References Cited

U.S. PATENT DOCUMENTS

| | | | |
|---|---|---|---|
| 6,049,334 A * | 4/2000 | Bates et al. ................... | 715/755 |
| 6,199,080 B1 * | 3/2001 | Nielsen ......................... | 715/206 |
| 6,205,454 B1 * | 3/2001 | Dauerer et al. ............... | 715/234 |
| 6,553,373 B2 * | 4/2003 | Boguraev et al. .............. | 707/5 |
| 6,585,776 B1 * | 7/2003 | Bates et al. .................... | 715/206 |
| 6,760,048 B1 * | 7/2004 | Bates et al. .................... | 715/797 |
| 8,015,492 B2 * | 9/2011 | Reid .............................. | 715/721 |
| 2002/0133565 A1 * | 9/2002 | Huat .............................. | 709/218 |
| 2002/0186252 A1 * | 12/2002 | Himmel et al. ............... | 345/787 |
| 2003/0202016 A1 * | 10/2003 | Acton ............................ | 345/776 |
| 2004/0205496 A1 * | 10/2004 | Dutta et al. ................. | 715/501.1 |
| 2006/0277490 A1 * | 12/2006 | Sauermann .................... | 715/787 |
| 2007/0136232 A1 * | 6/2007 | Nemoto et al. ................ | 707/2 |
| 2007/0180367 A1 * | 8/2007 | Chiang .......................... | 715/523 |

* cited by examiner

*Primary Examiner* — Jordany Nunez
(74) *Attorney, Agent, or Firm* — Kilpatrick Townsend & Stockton LLP

(57) ABSTRACT

Computer-implemented methods, apparatus, and systems implementing techniques for displaying labels included in a body of content are presented. Part of a portion of a body of content is displayed in a display area. The body of content includes a label for the portion, and the label has a normal position adjacent to and not overlapping the portion in the body of content. The label is displayed in the display area in the normal position if doing so places the label fully within the display area. The label is displayed at a separate location only if displaying the label in the normal position does not place the label fully within the display area and only while any non-trivial part of the portion is displayed in the display area.

77 Claims, 11 Drawing Sheets

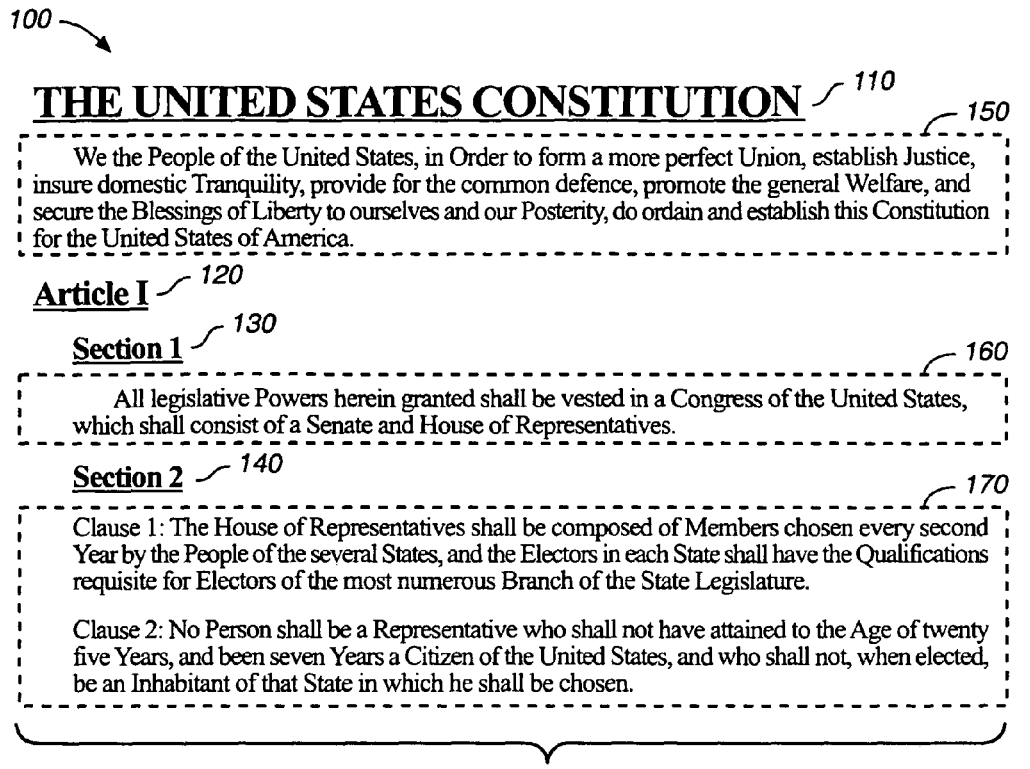
FIG._1A
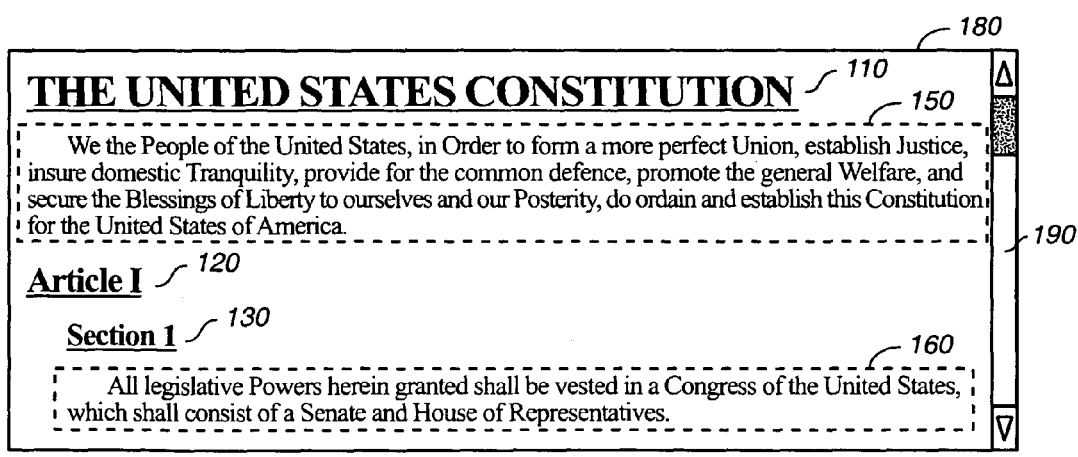
FIG._1B

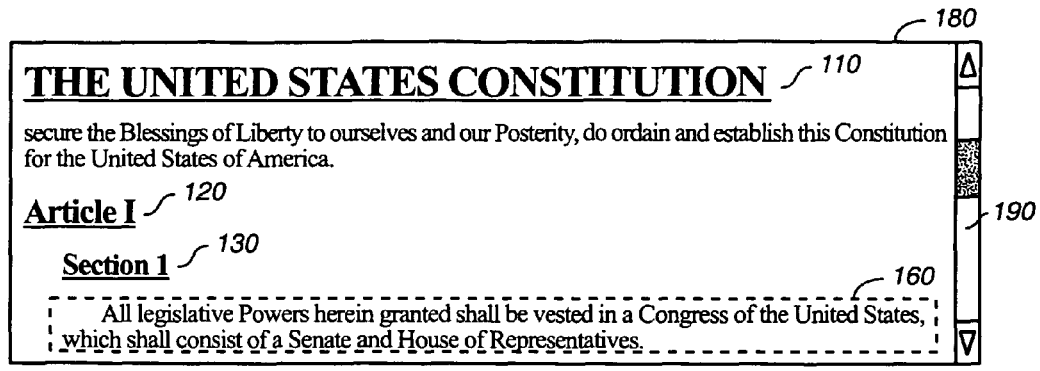
FIG._1C
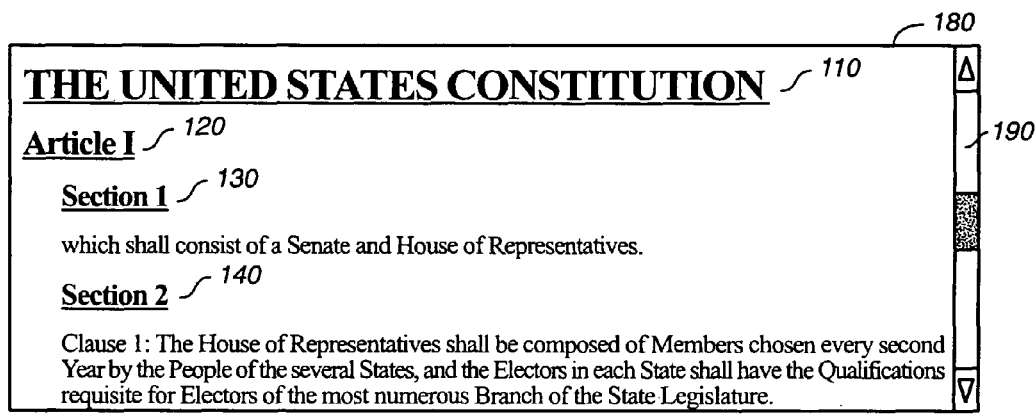
FIG._1D
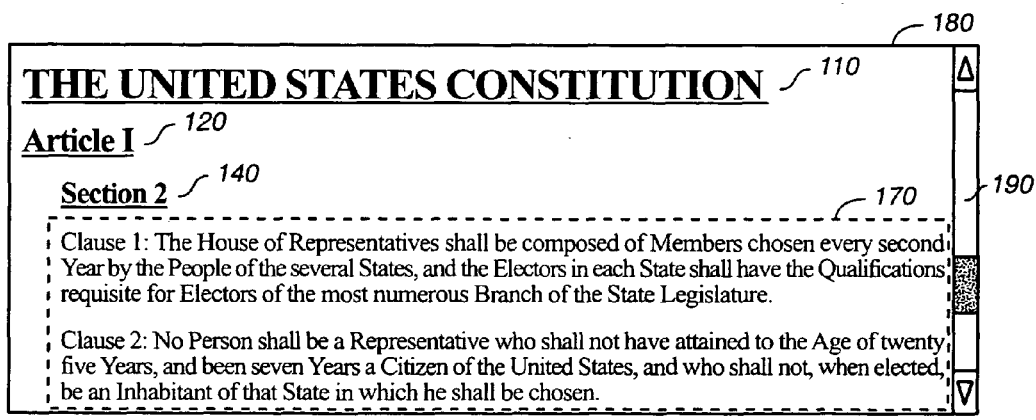
FIG._1E

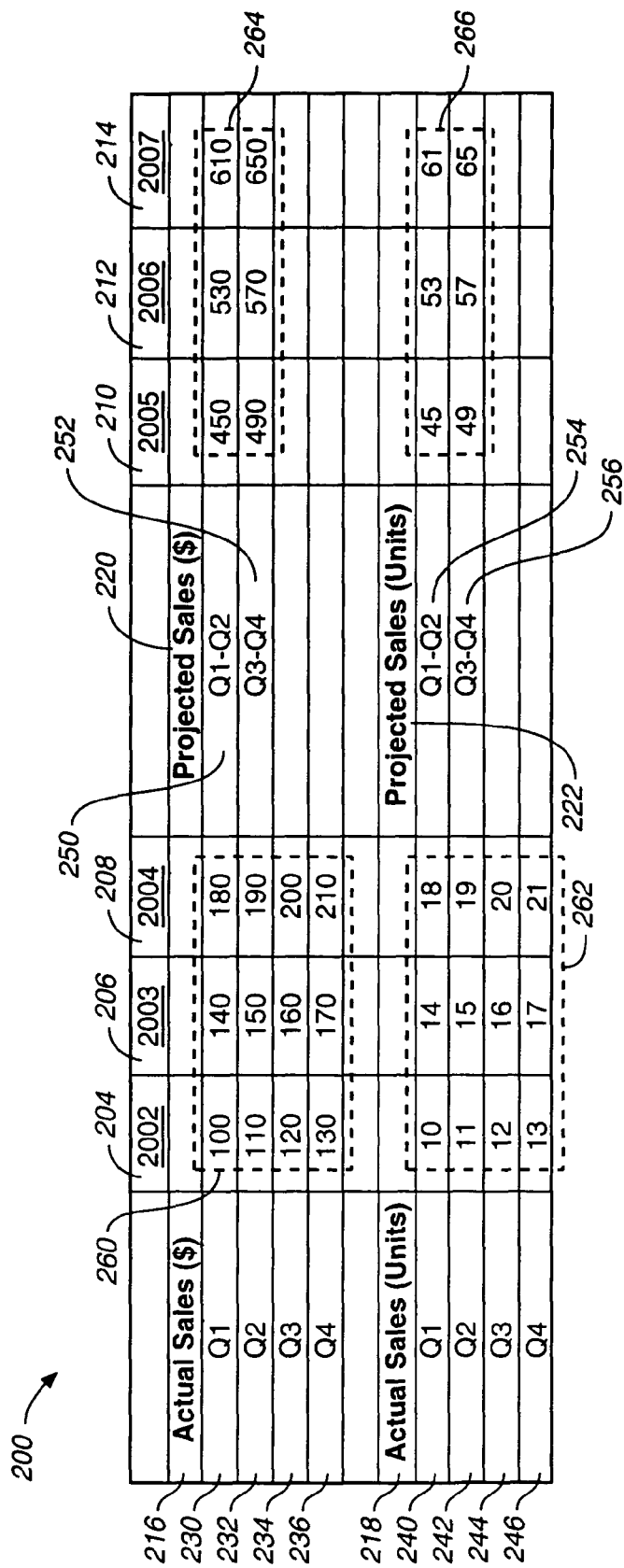
FIG._2A

FIG._2B

| | 2002 | 2003 | 2004 | | |
|---|---|---|---|---|---|
| Actual Sales ($) | | | | Projected Sales ($) | |
| Q1 | 100 | 140 | 180 | Q1-Q2 | |
| Q2 | 110 | 150 | 190 | Q3-Q4 | |
| Q3 | 120 | 160 | 200 | | |
| Q4 | 130 | 170 | 210 | | |

FIG._2C

| | 2002 | 2003 | 2004 | | |
|---|---|---|---|---|---|
| Actual Sales ($) | | | | Projected Sales ($) | |
| Q4 | 130 | 170 | 210 | | |
| Actual Sales (Units) | | | | Projected Sales (Units) | |
| Q1 | 10 | 14 | 18 | Q1-Q2 | |
| Q2 | 11 | 15 | 19 | Q3-Q4 | |

FIG._2D

| | 2002 | 2003 | 2004 | | |
|---|---|---|---|---|---|
| Actual Sales (Units) | | | | Projected Sales (Units) | |
| Q2 | 11 | 15 | 19 | Q3-Q4 | |
| Q3 | 12 | 16 | 20 | | |
| Q4 | 13 | 17 | 21 | | |

| | ┌208 | ┌220 ┌280 | ┌252 ┌210 | ┌212 | |
|---|---|---|---|---|---|
| 216— | 2004 | Projected Sales ($) | 2005 | 2006 | |
| 232— Actual Sales ($) | | | | | |
| 234— Q2 | 190 | Q3-Q4 | 490 | 570 | |
| 236— Q3 | 200 | | | | |
| Q4 | 210 | | | | |
| 218— Actual Sales (Units) | | Projected Sales(Units) | | | — 290 |
| | | └222 | └295 | | |

FIG._2E

| | ┌212 | ┌214 | ┌280 | | | | |
|---|---|---|---|---|---|---|---|
| 222— | 2006 | 2007 | | | | | |
| 256— Projected Sales (Units) | | | | | | | |
| Q3-Q4 | 57 | 65 | | | | | — 290 |

FIG._2F

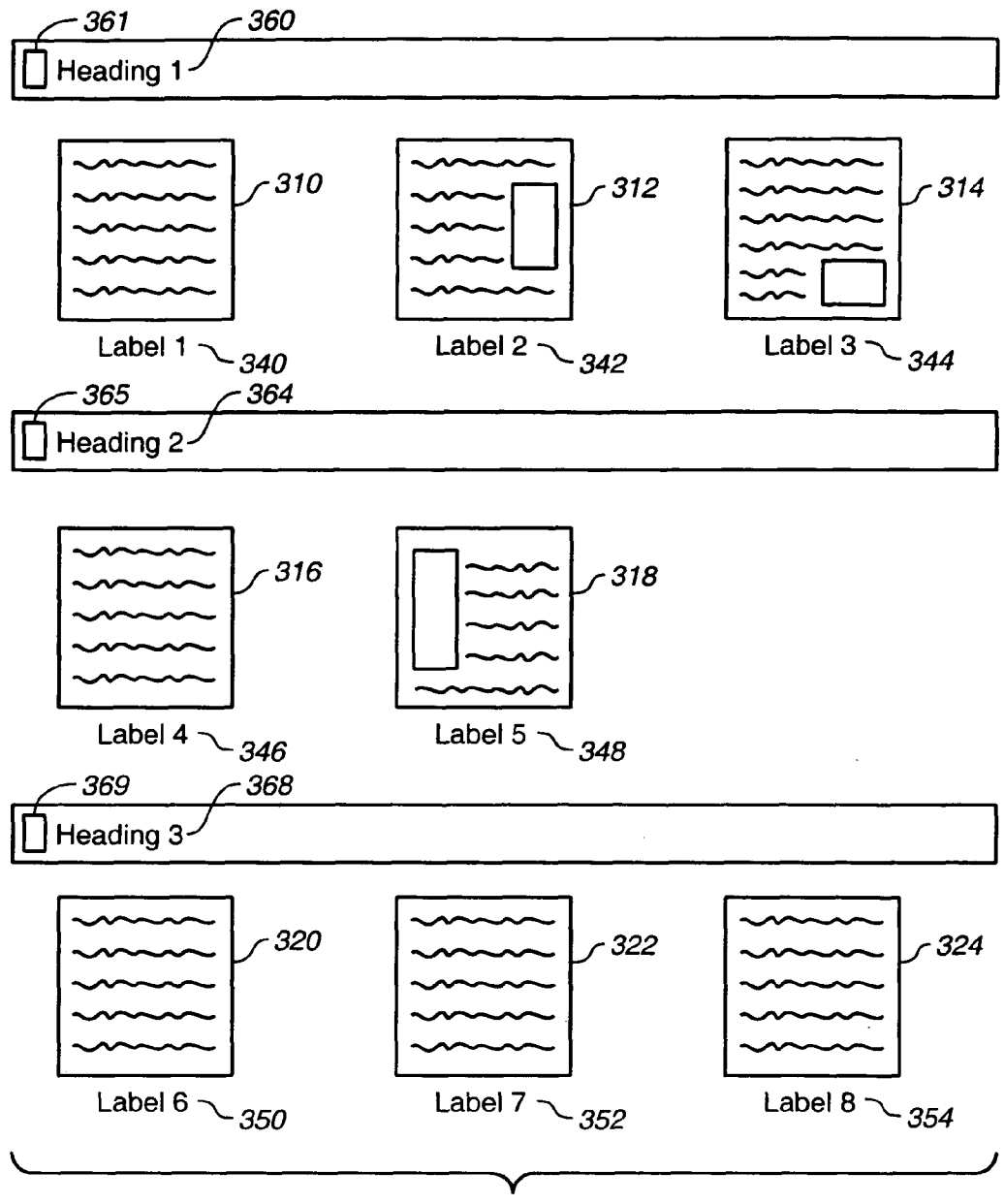
FIG._3A

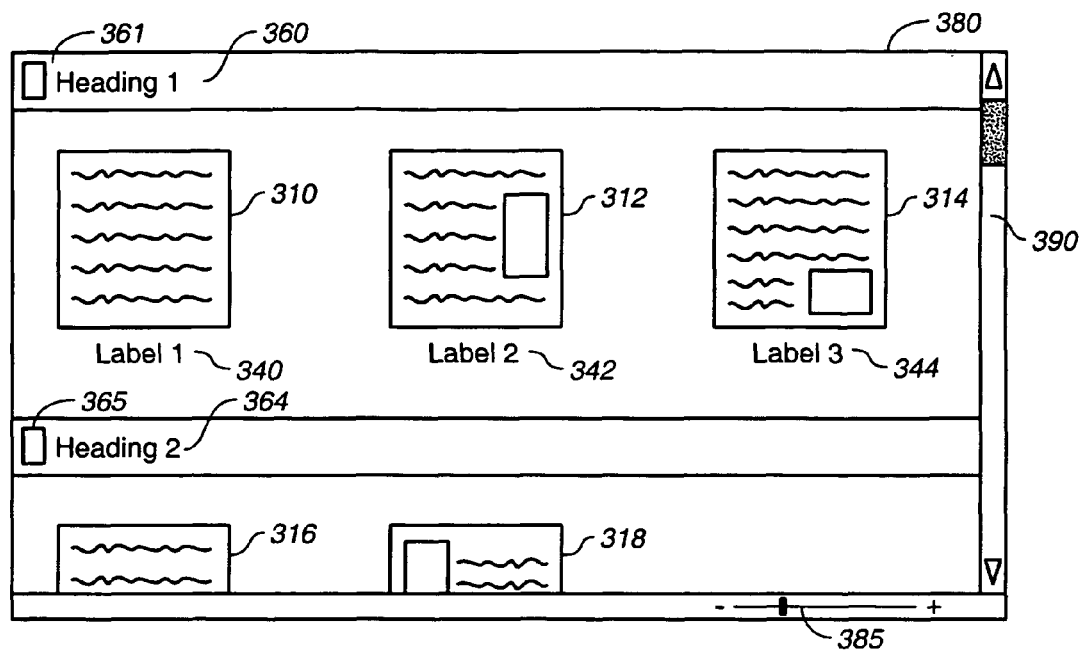
FIG._3B
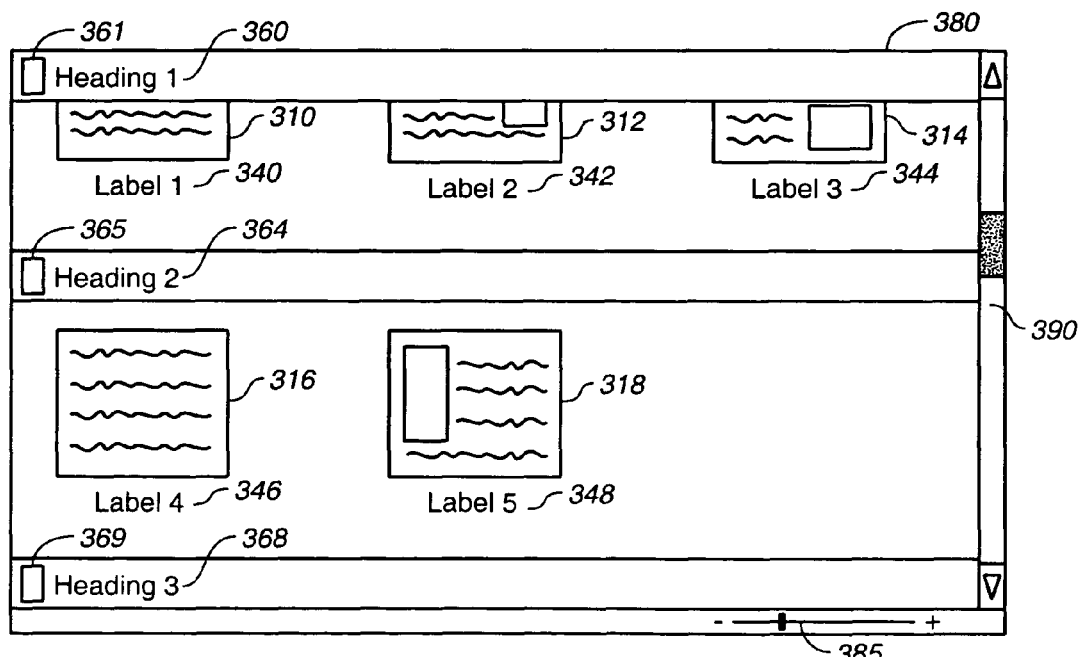
FIG._3C

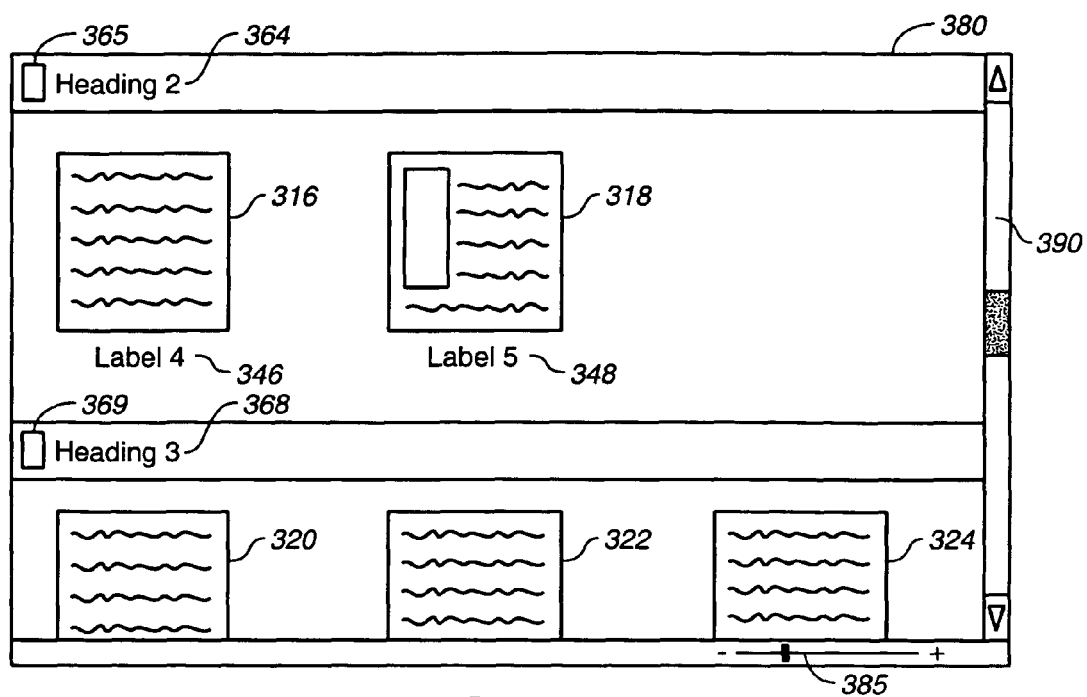
FIG._3D

```
                400 ──┐       ┌─ 410
                       <person>            ┌─ 431
                 411 ─┐  ┌─ <name>John</name>
                 412 ─┘  <children>
                            <daughter>
                               <age>10</age>  ─┐─ 434
                            </daughter>
                            <son>
                 415 ─┐         <age>8</age>
                               </son>
                       </children>
                       <job>Engineer</job>
                    </person>
```
FIG._4A
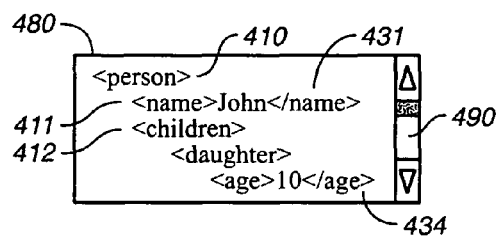
FIG._4B
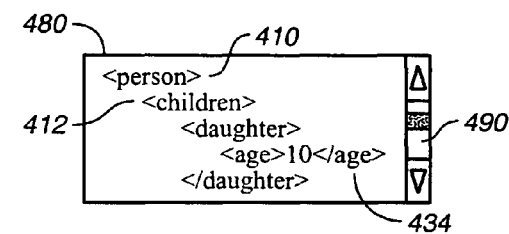
FIG._4C
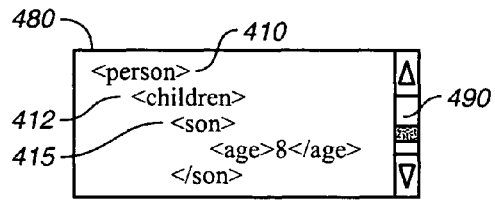
FIG._4D
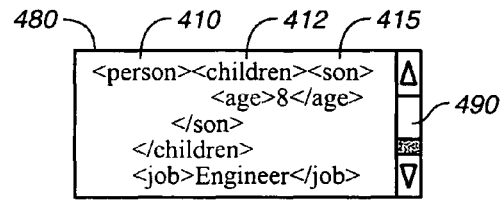
FIG._4E

```
500                #include <stdio.h>      510
                   int main(void)          520
      524       {
              530    int i, j;
              540    for (i = 0; i < 7; i += 1) {
                  550    if (i > 3) {
                       560   /* Compute i^2 */
                             j = i ^ 2;
              546   }              }
                                   556
      526             return (0);
              }                    575
```
FIG._5A
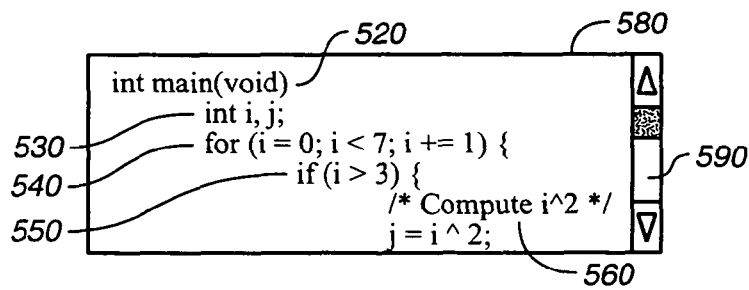
FIG._5B
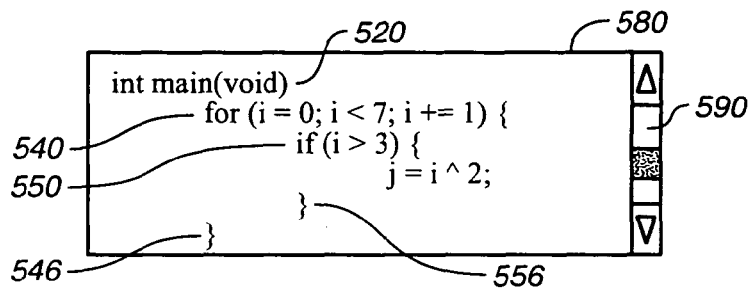
FIG._5C
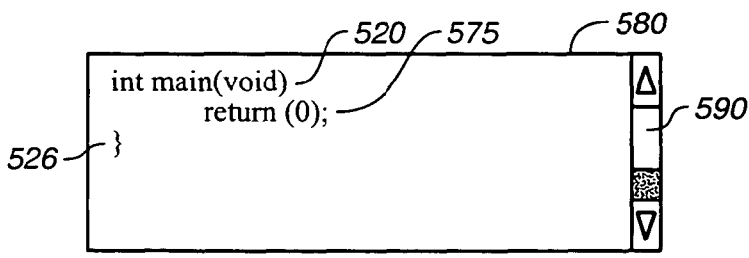
FIG._5D

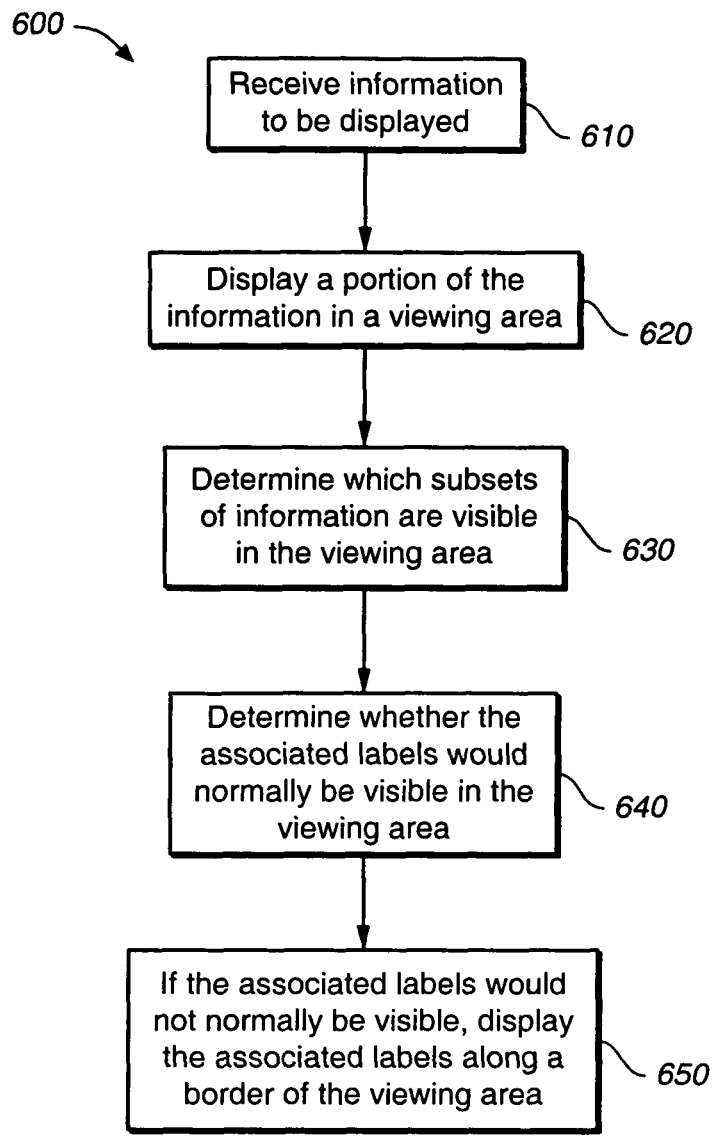
FIG._6

DISPLAYING INFORMATION HAVING HEADERS OR LABELS ON A DISPLAY DEVICE DISPLAY PANE

BACKGROUND

The present invention relates to displaying information on an electronic device in an interactive system.

Electronic devices, such as personal computers and personal digital assistants (PDAs), typically include a display to provide information (e.g., documents or directories of files) to a user. A user interface can present information on the display in one or more display panes. The viewing area of every pane is of a finite extent, so when a large amount of information is being displayed to a user, only part of the information typically is displayed in the pane at any given time.

User interfaces often allow a user to scroll through information along one or more dimensions. Scrolling allows a user to bring a section of the information that previously was out of sight into the pane. If a user cannot view all of the information simultaneously, it can be difficult for the user to keep track of what section of the information they are viewing.

A body of information is commonly organized into multiple (possibly overlapping) subsets of information that have associated visible labels, such as headings or names. For example, word-processing documents stored in a file system typically are arranged into named folders, the names of which are displayed in a user interface for the file system. Each document typically includes an associated filename or title that also is displayed. Within an individual document, sections and subsections typically have associated headings and subheadings that are displayed in a word-processing application. In a spreadsheet, a cell of information can have two or more associated headings, such as one heading for the column in which the cell is located, and one for the row.

When the information displayed in the pane of a conventional user interface is scrolled, the visible labels associated with subsets of the information scroll along with the information because the labels are part of the information. Some labels provide contextual cues (e.g., headings or directory names), and some labels provide details (e.g., the size or date of creation of a file) about the information with which they are associated.

Some user interfaces provide a separate window that displays contextual information for primary information being displayed in a main window. For example, in a file system, a directory tree often is displayed while a user views the contents of a folder. In a word-processing application, a listing of headings and subheadings in a document can be displayed in a separate pane while the user is editing the document. In a spreadsheet application, rows, columns, or both can be frozen so that they do not scroll with the other cells in a spreadsheet.

Certain display environments, in which the display of information is not controlled by a user, display a label when any portion of information with which the label is associated is visible. For example, a non-interactive display environment exists for displaying information on a television screen. The information is scrolled in a display area on the screen, and visible labels associated with subsets of the information scroll along with the information. When certain labels (e.g., start times in a directory of television programs) reach the top of the display area, the label is fixed while the subset of information continues to scroll. A viewer does not have control over the display of the information in this non-interactive display environment.

Some computer programs allow a user to place a comment in a document. The Adobe® Acrobat® application allows a user to place a comment in a document by adding an electronic sticky note. When displayed, a sticky note overlaps the content of the document and does not affect the original layout of the document. The sticky note can be displayed in a normal display position overlying a portion of the page on which the note is located. If the normal display position of the note is visible, the note scrolls with the content. If the normal display position of the note is not visible, but part of the page on which the note is located is visible, the note remains visible at an edge of the display area as the page is scrolled. When the page scrolls out of view, the note scrolls out of view as well. Highlighting can indicate specific words or lines in the document to which the sticky note is related, but the display behavior of the note is based on the page on which the note is placed, rather than on the highlighted text.

SUMMARY

In one aspect, the invention features computer-implemented methods and apparatus, including computer program products, implementing techniques for displaying information. A user-selected part of a first portion of a body of content is displayed in a display area according to a rendering of the body of content. The body of content includes a first label for the first portion, and the rendering places the first label at a normal position adjacent to and not overlapping the first portion in the body of content. The first label is displayed in the display area in the normal position relative to the first portion if doing so places the first label fully within the display area. The first label is displayed at a separate location only if displaying the first label in the normal position does not place the first label fully within the display area and only while any non-trivial part of the first portion is displayed in the display area. The separate location is distinct from the normal position.

Particular implementations can include one or more of the following features. A user-selected part of a second portion of the body of content is displayed in the display area according to the rendering of the body of content. The body of content includes a second label for the second portion, and the rendering places the second label at a normal position adjacent to and not overlapping the second portion in the body of content. The second label is distinct from the first label, and the second portion includes the first portion. The second label is displayed in the display area in the normal position relative to the second portion if doing so places the second label fully within the display area. The second label is displayed at the separate location only if displaying the second label in the normal position relative to the second portion does not place the second label fully within the display area and only while any non-trivial part of the second portion is displayed in the display area. The separate location is distinct from the normal position relative to the second portion. The first label is displayed adjacent to the second label while both labels are displayed at the separate location. The first label is displayed adjacent to the second label in one of (i) a normal positional relationship and (ii) a space-saving positional relationship.

The separate location is one of an edge of the display area and an auxiliary display area. The first label is displayed as a semi-transparent background in the display area. The body of content is generated dynamically. The first label displayed at the separate location is visually differentiated from the first label displayed in the normal position. A number of labels displayed at the separate location, an area used to display labels at the separate location, or both, are limited. The user-selected part is a proper subset of the first portion. The body of content is a word-processing document, the first label is a heading, and the first portion lies between the first label and a second label. The first portion is one of a figure, a table, and a text box, and the first label is a caption. The first portion is a set of images, each image representing a page in a document, and the first label includes a name of the document.

An end of the first portion is indicated by an explicit end marker in the body of content. The first portion is scrolled to display the user-selected part, where the scrolling can be in two directions. The separate location is selected according to a relative relationship of the normal display position to the first portion. If the normal display position is below the first portion, a bottom edge of the display area is selected as the separate location. If the normal display position is above the first portion, a top edge of the display area is selected as the separate location. The first label is a closest label in the body of content that has a specified positional relationship to the first portion. The first label is one of a heading, a filename, a start tag, a programming-language statement, and a user-defined category name. The first label is a member of a user-selected group of labels, where the body of content includes labels that are not members of the group of labels. The display area is resized, where the separate location is a location in the display area, and the separate location is adjusted based on the resizing.

In another aspect of the invention, content is received for display in a display area. The content has an associated label, where the label has a normal position adjacent to, and not overlapping, the content. The content and the label are scrolled in one direction responsive to user input until the label substantially reaches a boundary of the display area. The label is fixed at the boundary, while the content continues to be scrolled, until no part of the content with which the label is associated is visible in the display area.

Particular implementations can include one or more of the following features. The label is above the content with which the label is associated, and the label is fixed to a top of the display area. The label is below the content with which the label is associated, and the label is fixed to a bottom of the display area.

In one aspect, the invention features methods and apparatus implementing techniques that receive user input scrolling a body of content in a display area in a first direction toward a first edge of the display area to display a label preceding a portion of the body of content as the body of content is scrolled in the first direction, where the label is associated with the portion. After the label is scrolled to the first edge of the display area, the label is fixed at the first edge of the display area while the body of content continues to be scrolled in the first direction as long as, but no longer than, any part of the portion is visible in the display area.

In another aspect, the invention features a system for displaying information. The system includes means for displaying a user-selected part of a first portion of a body of content in a display area according to a rendering of the body of content. The body of content includes a first label for the first portion, and the rendering places the first label at a normal position adjacent to and not overlapping the first portion in the body of content. The system includes means for displaying the first label in the display area in the normal position relative to the first portion if displaying the first label in the normal position places the first label fully within the display area. The system also includes means for displaying the first label at a separate location only if displaying the first label in the normal position does not place the first label fully within the display area and only while any non-trivial part of the first portion is displayed in the display area. The separate location is distinct from normal location.

Particular implementations can include means for performing one or more of the following functions. The first label displayed at the separate location is visually differentiated from the first label displayed in the normal position. One of (i) a number of labels displayed at the separate location and (ii) an area of the separate location used to display the labels is limited. The first portion is scrolled to display the user-selected part. The separate location is selected according to a relative relationship of the normal position to the first portion.

The invention can be implemented to realize one or more of the following advantages. A label associated with a subset of a group of information is visible in a pane when any part of the subset is visible in the pane. A user can scroll through the information quickly to find a desired subset without hunting for the precise location of labels. If a user quickly scrolls to an arbitrary location in the information, or if the user jumps to the arbitrary location (e.g., using a search feature), the user immediately sees the labels associated with the information at the arbitrary location.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 1A shows a document.
FIG. 1B shows the document displayed in a pane.
FIGS. 1C-1E show the document displayed in the pane after being scrolled.
FIG. 2A shows a spreadsheet document.
FIG. 2B shows the spreadsheet document in a pane.
FIGS. 2C-2F show the spreadsheet document in the pane after being scrolled.
FIG. 3A shows a dynamically-generated collection of thumbnail images.
FIG. 3B shows the collection of thumbnail images in a pane.
FIGS. 3C-3D show the collection of thumbnail images in the pane after being scrolled.
FIG. 4A shows an XML document.
FIG. 4B shows the XML document in a pane.
FIGS. 4C-4E show the XML document in the pane after being scrolled.
FIG. 5A shows a C program.
FIGS. 5B-5D show the C program in a pane after being scrolled.
FIG. 6 is a flowchart of a process for displaying labels in a pane.

Like reference numbers and designations in the various drawings indicate like elements.

DETAILED DESCRIPTION

This specification describes a user-interface design in which a label is displayed in a pane when a subset of information with which the label is associated is displayed in the pane. The label has a normal display position that is part of, and does not overlap, the displayed information. As the subset of information scrolls in a given direction, the label scrolls in a conventional manner until the label reaches a boundary of the pane. As long as the scrolling continues in the same direction and a non-trivial (that is, usable or identifiable) part of the subset of information with which the label is associated remains visible in the pane, the label remains fixed to the boundary of the pane. When the subset of information no longer is visible in the pane, the label scrolls out of the pane as well. Labels typically are adjacent to the associated subset of information in the plane of the pane when displayed in the normal display position. A body of information can include multiple subsets of information arranged in a linear order. Labels associated with the subsets of information have a position in the linear order that determines the normal display position of each label.

FIG. 1A shows a document 100 (e.g., a word-processing document) that includes a title 110, a heading 120, subheadings 130 and 140, and text blocks 150, 160, and 170. The title 110, the heading 120, and the subheadings 130 and 140 form a hierarchical set of labels. The subheading 140 is associated with the text block 170, and the subheading 130 is associated with text block 160. The heading 120 is associated with the subheadings 130 and 140 and with the text blocks 160 and 170. The title 110 is associated with the text blocks 150-170, the subheadings 130 and 140, and the heading 120. The foregoing associations exist by virtue of the relative physical positions of these parts of the document to each other on the displayed page or pages of the document.

FIG. 1B shows a pane 180 that includes a scroll bar 190. A user-selected portion of the document 100 is visible in the pane 180. The document 100 is scrolled all of the way to the top, so the title 110, the heading 120, the subheading 130, and the text block 150 are fully visible in their normal positions in the document 100. The text block 160 is partially obscured because it extends outside of the pane 180.

FIG. 1C shows the pane 180 after a user has scrolled down slightly in the document 100 (e.g., using the scroll bar 190 or cursor keys). The title 110 is fixed in the pane 180 because all of the text of the document 100 is associated with the title 110, and the text of the document 100 is still visible in the pane 180. In a conventional system, the title 110 would have scrolled out of the pane 180 as the user scrolled down in the document 100. The heading 120 and the subheading 130 have scrolled up in their normal positions adjacent to text box 160 as the user scrolled down.

FIG. 1D shows the pane 180 after the user has scrolled down farther in the document 100. The title 110 is still fixed in the pane 180. Part of the text box 160 has scrolled out of the pane 180. The heading 120 and the subheading 130 are fixed in the pane 180 because both are associated with the text box 160, and part of the text box 160 is still visible. The subheading 140 has scrolled up normally as the user scrolled down.

FIG. 1E shows the pane 180 after the user has scrolled down even farther in the document 100. The title 110 and the heading 120 are still fixed in the pane 180. All of the text box 160 has scrolled out of the pane 180, so the subheading 130 no longer is fixed because no text associated with subheading 130 is visible in the pane 180. If the user were to scroll back up in the document 100 far enough that part of the text block 160 (e.g., the line "which . . . Representatives.") reappeared, the subheading 130 would again be fixed below the heading 120. The subheading 140 has scrolled up normally as the user scrolled down and will remain visible as long as part of the text box 170 is visible.

Sometimes it is not desired to display all of the levels of a hierarchical set of labels, or to fix all the labels that could be fixed. For example, fixing the title 110 in FIGS. 1C-1E may be of limited use because all of the text of the document 100 is associated with the title 110. A display system can specify which labels are necessary or useful to fix and allow the other labels to scroll normally. What levels of labels or kinds of labels (e.g., headings, table headings, and figure captions) to fix can also be user-selectable. A user can decide whether to fix labels, or whether to allow labels to scroll in a conventional manner.

The discussion of FIGS. 1A-1E assumes that the labels in the document 100 have already been identified. Labels can be identified explicitly or implicitly. In a word-processing environment, the title 110, the heading 120, and the subheadings 130 and 140 typically have styles associated with them. The styles allow a word-processing application to identify the relevant labels and the subsets(s) of document 100 with which each label is associated. For example, in an environment that uses hierarchical labels, content between two labels at the same level of the hierarchy can be associated with the first label, with the second label, or with a label specified by a user.

In an application that processes documents that do not contain information explicitly identifying labels, a document can be processed to infer the existence of labels based on properties of the text. For example, a method that examines the layout (e.g., paragraph length and word position) and text properties (e.g., font size, underlining, and bolding) of the document can be used to find labels. This method can also be used to find labels such as captions for figures, tables, or text boxes. The figure, table, or text box is identified in the document, and a caption associated with the object is found by examining the layout and text properties of text adjacent to the object.

FIG. 2A shows a spreadsheet document 200 that includes column labels 204-214 and row labels 230-256. Labels 216-222 are associated with areas (i.e., both rows and columns) of the document 200. The document 200 also includes blocks of cells 260-266. Each cell within the blocks of cells is uniquely identifiable by the combination of a row coordinate and a column coordinate.

FIG. 2B shows a pane 280 that includes a vertical scroll bar 290 and a horizontal scroll bar 295. A portion of the document 200 is visible in the pane 280. The document 200 is scrolled all of the way to the top left corner, so the column labels 204-208, the labels 216 and 220, the row labels 230-236 and 250-252, and the block of cells 260 are fully visible in their normal positions in the document 200 (that is, their positions in the document 200 shown in FIG. 2A).

FIG. 2C shows the pane 280 after a user has scrolled down in the document 200. The rows containing column labels 204-208 and the labels 216 and 220 are fixed because portions of the document 200 associated with these labels are still visible in the pane 280. The rows associated with row labels 230-234 and 250-252 have scrolled out of pane 280, so the row labels 230-234 and 250-252 no longer are visible. The rows containing labels 218 and 222 and the row labels 240-242 and 254-256 have scrolled into the pane 280 in a normal manner as the user scrolled down.

FIG. 2D shows the pane 280 after the user has scrolled down farther in the document 200. The row containing column labels 204-208 remains fixed in the pane 280, but the row containing labels 218 and 222 has replaced the row containing labels 216 and 220 because no portion of the document 200 that is associated with the labels 216 and 220 is visible.

FIG. 2E shows the pane 280 after the user has scrolled up and to the right in the document 200. The row containing labels 216 and 220 again is fixed, as is the column containing row labels 232-236. Because the columns associated with column labels 204 and 206 have scrolled out of the pane 280, the column labels 204 and 206 are not visible.

FIG. 2F shows the pane 280 after a user has scrolled down and to the right in the document 200. The label 222, the row label 256, and column labels 212 and 214 are fixed because cells from the block of cells 266 are associated with these labels and are visible.

The discussion of FIGS. 2A-2F assumes that the labels in the document 200 have already been identified. A user can explicitly identify labels in a spreadsheet environment (e.g., by assigning a label type to a spreadsheet cell). The existence of labels can also be inferred, for example, by recognizing patterns in the contents of the spreadsheet cells.

FIG. 3A shows a collection 300 of thumbnail images. The collection 300 includes thumbnail images 310-324, each of which is an image of a page in a document. Headings 360, 364, and 368 separate the thumbnail images 310-324 by document. Therefore, thumbnail images 310-314 are part of a first document, thumbnail images 316-318 are part of a second document, and thumbnail images 320-324 are part of a third document. The headings 360, 364, and 368 display information about the document to which the respective heading's thumbnail images belong (e.g., a title, number of pages, filename, directory, file size, author, and/or date of creation). Icons 361, 365, and 369 are displayed next to the headings 360, 364, and 368. The icons 361, 365, and 369 graphically indicate the file type of the corresponding document. Labels 340-354 display information associated with the respective thumbnail image 310-324 (e.g., page number or layout information).

The collection 300 is generated dynamically. That is, the visual presentation of the images and headings displayed in collection 300 is not stored in a file, but is assembled dynamically from the documents.

FIG. 3B shows a pane 380 in which the collection 300 is displayed. Thumbnail images 310-318, headings 360 and 364, icons 361 and 365, and labels 340-344 are visible. Labels 346-348, which are associated with thumbnail images 316-318 and are located below the images, are not visible in the pane 380. In one implementation, such labels are fixed at the bottom of the pane 380 whenever the associated thumbnail images 316-318 are partially visible. The labels are fixed at the bottom of the pane 380 because the position of the label is below the image with which it is associated. A slider 385 allows a user to vary the size of the thumbnail images 310-318. A scroll bar 390 allows the user to scroll through one or more documents to see all of the thumbnail images.

FIG. 3C shows the pane 380 after the user has scrolled down. Labels 346 and 348 are now visible. Heading 360 and icon 361 are fixed at the top of the pane 380 because the associated thumbnail images 310-314 are visible. A new heading 368 and icon 369 have scrolled into the pane 380.

FIG. 3D shows the pane 380 after the user has scrolled down farther. The heading 364 and icon 365 have replaced the heading 360 and the icon 361 because thumbnail images 310-314 have scrolled out of the pane 380. Thumbnail images 320-324 have scrolled into the pane 380.

In another implementation, collection 300 and the user interface displays illustrated in FIGS. 3B-3D are generated by an image viewing or image editing application. The thumbnail images 310-324 are individual images that are associated with the respective headings 360, 364, and 368 because the thumbnail images 310-314 share one or more common traits, the thumbnail images 316-318 share one or more common traits that are different from the traits shared by the thumbnail images 310-314, and the thumbnail images 320-324 share one or more common traits that are different from the traits shared by the thumbnail images 310-318. Examples of common traits include: being stored in the same directory in a file system, having been created on the same date, or having been grouped together by the user. At least one of the common traits is indicated by the corresponding heading 360, 364, or 368.

Fixing labels in a display area while scrolling is useful in a markup language editing context. For example, in Extensible Markup Language (XML) documents, elements are defined using a start tag and an end tag. The end tag is an explicit end marker, so text between the start tag and the end tag is an element's content. An element can contain other elements.

FIG. 4A shows an XML document 400 that contains start tags 410-412 and 415 and end tags 431 and 434.

FIG. 4B shows a pane 480 in an editing application. The pane 480 includes a scroll bar 490. A portion of the XML document 400 is visible in the pane 480. The XML program 400 is scrolled all of the way to the top, so the start tags 410-412 and the end tags 431 and 434 are visible in their normal positions in the XML document 400.

FIG. 4C shows the pane 480 after a user has scrolled down one line in the XML document 400. The start tag 410 for the element "person" is fixed in the pane 480 because contents of the element "person" are visible. In a conventional editing application, the start tag 410 would scroll out of the pane 480 as the user scrolled down one line in the XML document 400. The start tag 411 and the end tag 431 have scrolled out of pane 480 because no content associated with the element "name" is visible in the pane 480.

FIG. 4D shows the pane 480 after the user has scrolled down farther in the XML document 400. The start tags 410 and 412 are fixed in the pane 480 because content associated with the elements "person" and "children" is still visible.

FIG. 4E shows the pane 480 in an alternative implementation. The fixed tags—start tags 410, 412, and 415—are all displayed on the same line at the top of the pane 480, thus saving space in the pane 480.

FIG. 5A shows a program 500 written in the C programming language. The program 500 includes an "include" directive 510, a function header 520, a declaration 530, a "for" statement 540, and an "if" statement 550. The program 500 also includes a comment 560, a return statement 575, opening brace 524, and closing braces 526, 546, and 556. An opening brace and a closing brace (an explicit end marker) enclose portions of a C program that are associated with a label. For example, the opening brace 524 and the closing brace 526 enclose a portion of the program 500 that is associated with the function header 520.

FIG. 5B shows a portion of the program 500 displayed in the pane 580. The pane 580 includes a scroll bar 590. The contents of the pane 580 have been scrolled, and the function header 520 is fixed at the top of the pane 580. The function header 520 is fixed because a portion of the program 500 that is associated with the function header 520 is visible in the pane 580. The directive 510 has scrolled out of the pane 580, as has opening brace 524.

FIG. 5C shows the pane 580 after a user has scrolled down farther in the program 500. The declaration 530 and the comment 560 have scrolled out of the pane 580, and the function header 520, the statement 540, and the statement 550 are fixed. Closing braces 546 and 556 are visible in the pane 580 and indicate where the portions of the program 500 that are associated with the statements 540 and 550 respectively end.

FIG. 5D shows the pane 580 after a user has scrolled almost to the end of the program 500. Statements 540 and 550 have scrolled out of the pane 580 because the portions of the program 500 with which statements 540 and 550 are associated are not visible in the pane 580. The function header 520 is still fixed at the top of pane 580 because the function header 520 is associated with statement 575.

In an alternative implementation, opening braces are fixed in a pane along with the label with which the opening braces are associated. For example, in FIG. 5B, the opening brace 524 would be fixed on the line below, or on the same line as, the function header 520.

As shown in FIG. 6, a process 600 receives a body of information that is to be displayed in a pane (step 610). The body of information includes subsets of information that have associated visible labels. The labels are part of the information to be displayed and typically occupy specific locations in the information. For example, a label that is a heading typically is located just before the information with which the heading is associated.

When the body of information is too extensive to display using the settings of the pane (e.g., zoom), only a portion of the information is displayed (step 620). The process 600 determines which subset or subsets of information are visible in the pane (step 630). The process 600 also determines whether the label or labels associated with any visible subsets are visible at their specific location in the information (step 640). That is, the process 600 determines whether a label with which a visible subset is associated is outside of the pane.

If the label for the visible subset is outside of the pane, the label is fixed along a border of the pane (step 650). When a user is scrolling the information, step 650 fixes the label to the border of the pane. In one implementation, labels can be fixed at a pre-selected location other than the border of the pane. For example, if the label for a visible subset is outside of the pane, the label can be displayed in a popup pane that overlies the main pane in which the information is displayed or in a second pane that does not overlie the main pane. Alternatively, an expanded version of the label can be displayed semi-transparently in the background of the main pane, and the information can be displayed opaquely over it.

In one implementation, labels are fixed in a pane when subsets of information are accessed using a method other than scrolling. For example, if a user searches for a particular term in a document and the application jumps to a portion of the document containing the search term, labels associated with any visible subsets of the information can be fixed in the pane as described above.

In another implementation, labels that are not being displayed at their normal location in the information (e.g., labels that have been fixed to the border of the pane) are visually differentiated. For example, such labels can be displayed in a special color or can have one or more changed visual attributes, such as transparency.

In yet another implementation, the number of labels that are fixed in a pane is limited. Alternatively, the area of the pane in which labels are fixed is limited. In one example, the area of the pane in which labels are fixed is limited to one quarter of the total area of the pane. When fixed labels occupy a quarter of the total area, some labels that normally would be fixed are removed. If the labels are part of a hierarchical set of labels, the highest (alternatively, lowest) labels in the hierarchy can be removed.

The invention and all of the functional operations described in this specification can be implemented in digital electronic circuitry, or in computer software, firmware, or hardware, including the structural means disclosed in this specification and structural equivalents thereof or in combinations of them. The invention can be implemented as one or more computer program products, i.e., one or more computer programs tangibly embodied in an information carrier, e.g., in a machine-readable storage device, for execution by, or to control the operation of, data processing apparatus, e.g., a programmable processor, a computer, or multiple computers.

A computer program (also known as a program, software, software application, or code) can be written in any form of programming language, including compiled or interpreted languages, and it can be deployed in any form, including as, a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order and still achieve desirable results.

What is claimed is:

1. A-machine-readable storage device having computer program code stored thereon encoding a computer program product, said computer program product comprising:
    code for displaying a user-selected part of a first portion of a body of content in a display area according to a rendering of the body of content, the body of content including a first label for the first portion, the rendering placing the first label at a normal position adjacent to and not overlapping the first portion in the body of content;

code for displaying the first label in the display area in the normal position relative to the first portion if displaying the first label in the normal position places the first label fully within the display area; and code for displaying the first label at a separate location only if displaying the first label in the normal position does not place the first label fully within the display area and only until no part of the first portion is displayed in the display area, the separate location being distinct from the normal position.

2. The machine-readable storage device of claim 1, said computer program product further comprising:

code for displaying a user-selected part of a second portion of the body of content in the display area according to the rendering of the body of content, the body of content including a second label for the second portion, the rendering placing the second label at a normal position adjacent to and not overlapping the second portion in the body of content, the second label being distinct from the first label, the second portion including the first portion;

code for displaying the second label in the display area in the normal position relative to the second portion if displaying the second label in the normal position relative to the second portion places the second label fully within the display area; and code for displaying the second label at the separate location only if displaying the second label in the normal position relative to the second portion does not place the second label fully within the display area and only while any part of the second portion is displayed in the display area, the separate location being distinct from the normal position relative to the second portion.

3. The machine-readable storage device of claim 2, wherein:

the first label is displayed adjacent to the second label while both labels are displayed at the separate location.

4. The machine-readable storage device of claim 3, wherein:

the first label is displayed adjacent to the second label in one of a normal positional relationship and a space-saving positional relationship while both labels are displayed at the separate location.

5. The machine-readable storage device of claim 1, wherein:

the separate location is one of an edge of the display area and an auxiliary display area.

6. The machine-readable storage device of claim 1, wherein:

said code for displaying the first label at the separate location includes code for displaying the first label as a semi-transparent background in the display area.

7. The machine-readable storage device of claim 1, wherein:

the body of content is generated dynamically.

8. The machine-readable storage device of claim 1, wherein:

the first label displayed at the separate location is visually differentiated from the first label displayed in the normal position.

9. The machine-readable storage device of claim 1, said computer program product further comprising:

code for limiting a number of labels displayed at the separate location, an area used to display labels at the separate location, or both.

10. The machine-readable storage device of claim 1, wherein:

the user-selected part is a proper subset of the first portion.

11. The machine-readable storage device of claim 1, wherein:

the body of content is a word-processing document;
the first label is a heading; and
the first portion lies between the first label and a second label.

12. The machine-readable storage device of claim 1, wherein:

the first portion is one of a figure, a table, and a text box; and
the first label is a caption.

13. The machine-readable storage device of claim 1, wherein:

the first portion is a set of images, each image representing a page in a document; and the first label includes a name of the document.

14. The machine-readable storage device of claim 1, wherein:

an end of the first portion is indicated by an explicit end marker in the body of content.

15. The machine-readable storage device of claim 1, said computer program product further comprising:

code for scrolling the first portion to display the user-selected part.

16. The machine-readable storage device of claim 15, wherein:

the first portion is scrolled in two directions.

17. The machine-readable storage device of claim 1, said computer program product further comprising:

code for selecting the separate location according to a relative relationship of the normal display position to the first portion.

18. The machine-readable storage device of claim 17, wherein:

if the normal display position is below the first portion, a bottom edge of the display area is selected as the separate location.

19. The machine-readable storage device of claim 17, wherein:

if the normal display position is above the first portion, a top edge of the display area is selected as the separate location.

20. The machine-readable storage device of claim 1, wherein:

the first label is a closest label in the body of content that has a specified positional relationship to the first portion.

21. The machine-readable storage device of claim 1, wherein:

the first label is one of a heading, a filename, a start tag, a programming-language statement, and a user-defined category name.

22. The machine-readable storage device of claim 1, wherein:

the first label is a member of a user-selected group of labels, the body of content including labels that are not members of the group of labels.

23. The machine-readable storage device of claim 1, said computer program product further comprising:

code for resizing the display area, wherein the separate location is a location in the display area; and
code for adjusting the separate location based on results of the code for resizing.

24. A machine-readable storage device having computer program logic stored thereon encoding a computer program product, said computer program product comprising:
- code for receiving content for display in a display area, the content having an associated label, the label having a normal position adjacent to and not overlapping the content; and
- code for scrolling the content and the label in one direction responsive to user input until the label substantially reaches a boundary of the display area and fix the label at the boundary, while continuing to scroll the content, until no part of the content with which the label is associated is visible in the display area.

25. The machine-readable storage device of claim 24, wherein:
- the label is above the content with which the label is associated; and
- the label is fixed to a top of the display area.

26. The machine-readable storage device of claim 24, wherein:
- the label is below the content with which the label is associated; and
- the label is fixed to a bottom of the display area.

27. A computer-implemented method comprising:
- displaying, in a display area of a display device coupled to a computer, a user-selected part of a portion of a body of content according to a rendering of the body of content, the body of content including a label for the portion, the rendering placing the label at a normal position adjacent to and not overlapping the portion in the body of content;
- displaying the label in the display area of the display device in the normal position adjacent to the portion if displaying the label in the normal position places the label fully within the display area; and
- displaying the label at a separate location only if displaying the label in the normal position does not place the label fully within the display area of the display device and only while any non-trivial part of the first portion is displayed in the display area of the display device, the separate location being distinct from normal location.

28. The computer-implemented method of claim 27, wherein:
- the body of content is generated dynamically.

29. The computer-implemented method of claim 27, further comprising:
- visually differentiating the label displayed at the separate location from the label displayed in the normal position.

30. The computer-implemented method of claim 27, further comprising:
- limiting a number of labels displayed at the separate location, an area of the separate location used to display labels, or both.

31. The computer-implemented method of claim 27, further comprising:
- scrolling the portion of content to display the user-selected part.

32. The computer-implemented method of claim 31, wherein:
- scrolling includes scrolling in two directions.

33. The computer-implemented method of claim 27, further comprising:
- selecting the separate location according to a relative relationship of the normal display position to the portion.

34. The computer-implemented method of claim 33, wherein:
- if the normal display position is below the portion, the separate location is a bottom edge of the display area.

35. The computer-implemented method of claim 33, wherein:
- if the normal display position is above the portion, the separate location is a top edge of the display area.

36. The computer-implemented method of claim 27, wherein:
- the label is a closest label in the body of content that has a specified positional relationship to the portion of content.

37. The computer-implemented method of claim 27, wherein:
- the label is one of a heading, a filename, a start tag, a programming-language statement, and a user-defined category name.

38. The computer-implemented method of claim 27, wherein:
- the label is a member of a user-selected group of labels, the body of content including labels that are not members of the group of labels.

39. The computer-implemented method of claim 27, wherein:
- the portion of content and the label are included in an encompassing portion, the body of content including an encompassing label for the encompassing portion.

40. A computer-implemented method comprising:
- receiving content for display in a display area of a display device coupled to a computer, the content having an associated label, the label having a normal position adjacent to and not overlapping the content; and
- scrolling the content and the label in one direction in the display area of the display device responsive to user input until the label substantially reaches a boundary of the display area and fixing the label at the boundary, while continuing to scroll the content, until no part of the content with which the label is associated is visible in the display area.

41. The computer-implemented method of claim 40, wherein:
- the label is above the content with which the label is associated; and
- fixing the label includes fixing the label to a top of the display area.

42. The computer-implemented method of claim 40, wherein:
- the label is below the content with which the label is associated; and
- fixing the label includes fixing the label to a bottom of the display area.

43. A system comprising:
- means for displaying a user-selected part of a first portion of a body of content in a display area according to a rendering of the body of content, the body of content including a first label for the first portion, the rendering placing the first label at a normal position adjacent to and not overlapping the first portion in the body of content;
- means for displaying the first label in the display area in the normal position relative to the first portion if displaying the first label in the normal position places the first label fully within the display area; and
- means for displaying the first label at a separate location only if displaying the first label in the normal position does not place the first label fully within the display area and only while any non-trivial part of the first portion is displayed in the display area, the separate location being distinct from normal location.

44. The system of claim 43, further comprising:
means for visually differentiating the first label displayed at the separate location from the first label displayed in the normal position.

45. The system of claim 43, further comprising:
means for limiting one of a number of labels displayed at the separate location and an area of the separate location used to display the labels.

46. The system of claim 43, further comprising:
means for scrolling the first portion to display the user-selected part.

47. The system of claim 43, further comprising:
means for selecting the separate location according to a relative relationship of the normal position to the first portion.

48. A computer-implemented method comprising:
modifying a display device to display scrolling of information on said display device such that commonly-organized information is grouped together, said commonly-organized information being identified by a first label associated with said commonly-organized information;
modifying said display device to display scrolling of said first label on said display device in conjunction with said displayed scrolling of said information, said first label scrolling being such that said first label remains visible on said display device in conjunction with said commonly-organized information to which said first label pertains;
rendering said first label visible but stationary on said display device when said first label arrives at a particular location of said display device while said information scrolls past said particular location in response to said displayed scrolling of said information; and
modifying said display device to remove said first label from view on said display device only when an unidentifiable portion of said commonly-organized information to which said label pertains remains visible on said display device.

49. The computer-implemented method of claim 48 further comprising:
modifying said display device to display scrolling of another label in conjunction with another group of commonly-organized information within said scrolling information, said another label being such that said another label remains visible on said display device in conjunction with said another group to which said another label pertains;
rendering said another label visible but stationary on said display device when said another label arrives at said particular location of said display device while said information scrolls past said particular location; and
modifying said display device to remove said label from view on said display device only when an unidentifiable portion of said another group remains displayed on said display device.

50. The computer-implemented method of claim 49 wherein said another label is displayed adjacent to said first label when both said first label and said another label are rendered stationary on said display device.

51. The computer-implemented method of claim 48 further comprising:
modifying said display device to adjust a transparency of said displayed first label responsive to said rendering.

52. The computer-implemented method of claim 48 wherein display of said first label during said displayed scrolling of said first label is visibly differentiated from display of said first label at said particular location.

53. The computer-implemented method of claim 48 wherein said displayed scrolling of said information and said displayed scrolling of said label occur in two or more directions.

54. The computer-implemented method of claim 48 wherein said particular location is relative to a direction of said displayed scrolling.

55. The computer-implemented method of claim 48 wherein said particular location is a top edge of a pane within which said information is displayed as scrolling on said display device when said first label is displayed above said commonly-organized information.

56. The computer-implemented method of claim 48 wherein said particular location is a bottom edge of a pane within which said information is displayed as scrolling on said display device when said first label is displayed below said commonly-organized information.

57. The computer-implemented method of claim 48 wherein said particular location is one of:
a top edge of said display device;
a bottom edge of said display device;
a side edge of said display device;
a top edge of a pane on said display device;
a bottom edge of said pane on said display device; and
a side edge of said pane on said display device.

58. A machine readable storage device with computer program code recorded thereon encoding a computer program product, said computer program product comprising:
code for receiving user input to scroll individual items of information on a display, said individual items partitioned into one or more subsets of said individual items having common traits, said one or more subsets each identifiable by a corresponding label;
code for scrolling a first label in association with a corresponding first subset of said one or more subsets toward an edge;
code for maintaining said first label stationary at said edge of said display while any information item within said first subset remains visible on said display; and
code for replacing said stationary first label only when all information items of said first subset have scrolled off of said display, wherein said stationary first label is replaced with a next label corresponding to a next subset of said one or more subsets which is scrolling in response to said user input.

59. The machine readable storage device of claim 58 wherein said next label is displayed adjacent to said first label when both said first label and said next label are maintained stationary.

60. The machine readable storage device of claim 58, said computer program product further comprising:
code for modifying a transparency of said first label responsive to said maintaining.

61. The machine readable storage device of claim 58 wherein display of said first label during execution of said code for scrolling said first label is visibly differentiated from display of said first label at said particular location.

62. The machine readable storage device of claim 58 wherein said code for scrolling said information and said code for scrolling said label occur in two or more directions.

63. The machine readable storage device of claim 58 wherein said particular location is relative to a direction implemented by said code for scrolling.

64. The machine readable storage device of claim 58 wherein said particular location is a top edge of a pane within which said information is scrolling when said first label is displayed above said commonly-organized information.

65. The machine readable storage device of claim 58 wherein said particular location is a bottom edge of a pane within which said information is scrolling when said first label is displayed below said commonly-organized information.

66. The machine readable storage device of claim 58 wherein said particular location is one of:
- a top edge of said display;
- a bottom edge of said display;
- a side edge of said display;
- a top edge of a pane within said display;
- a bottom edge of said pane within said display; and
- a side edge of said pane within said display.

67. A computer-implemented method comprising:
- rendering a set of information onto a viewing area of a display device;
- scrolling said set of information in said viewing area on said display device, said set arranged into one or more subsets of information, said one or more subsets each identifiable by one or more labels, wherein said one or more labels scrolls in association with a corresponding subset of said one or more subsets;
- maintaining a first label of said one or more labels stationary on said display device when said first label reaches an edge of said viewing area, wherein said set of information continues said scrolling, and wherein said first label is maintained stationary only while identifiable parts of a first subset to which said first label corresponds remains visible in said viewing area; and
- replacing said stationary first label at said edge of said viewing area with a next label associated with a next subset of said one or more subsets only when unidentifiable parts of said first subset remain in said viewing area, wherein said set of information continues said scrolling and wherein said next label is maintained stationary at said edge only while identifiable parts of a next subset to which said next label corresponds remains visible in said viewing area.

68. The computer-implemented method of claim 67 further comprising:
- replacing said stationary next label at said edge of said viewing area on said display device with a subsequent label associated with a subsequent subset of said one or more subsets when only unidentifiable parts of said next subset remain in said viewing area, wherein said set of information continues said scrolling and wherein said subsequent label is maintained stationary at said edge only while identifiable parts of a subsequent subset to which said subsequent label corresponds remains visible in said viewing area.

69. The computer-implemented method of claim 67 wherein said scrolling is configured to move said set of information in at least two directions on said display device.

70. The computer-implemented method of claim 69 further comprising:
- detecting reversal of a direction of said scrolling of said set of information on said display device;
- replacing said stationary next label at said edge with said first label only when identifiable parts of said first subset reenter said viewing area, wherein said set of information continues said scrolling in said reversed direction and wherein said first label is maintained stationary at said edge only while less than all information in said first subset has reentered said viewing area.

71. The computer-implemented method of claim 67 further comprising:
- modifying a transparency of said first label on said display device responsive to said maintaining.

72. The computer-implemented method of claim 67 wherein display of said first label during said scrolling of said first label is visibly differentiated from display of said first label when stationary.

73. The computer-implemented method of claim 67 wherein said edge at which said first label is maintained stationary is relative to a direction of said scrolling on said display device.

74. The computer-implemented method of claim 73 wherein said edge is a top edge of said viewing area when said scrolling first label is displayed above said first subset.

75. The computer-implemented method of claim 73 wherein said edge is a bottom edge of said viewing area when said scrolling first label is displayed below said first subset.

76. The computer-implemented method of claim 67 wherein said viewing area comprises dimensions of said display device.

77. The computer-implemented method of claim 67 wherein said viewing area comprises dimensions of a pane that is smaller than dimensions of said display device.

* * * * *